May 23, 1939.   R. A. WRIGHT   2,159,494
COMBINED WALL BED AND DINETTE
Filed May 24, 1937   3 Sheets-Sheet 1
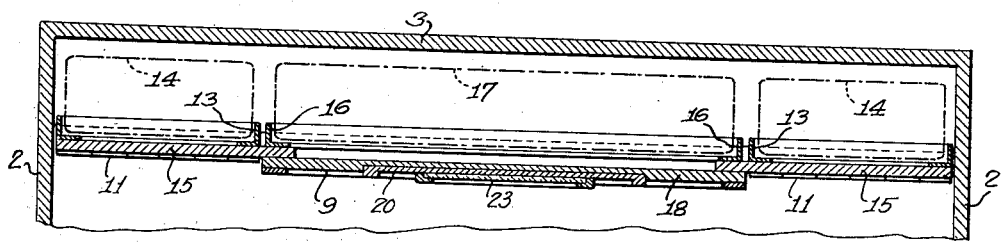
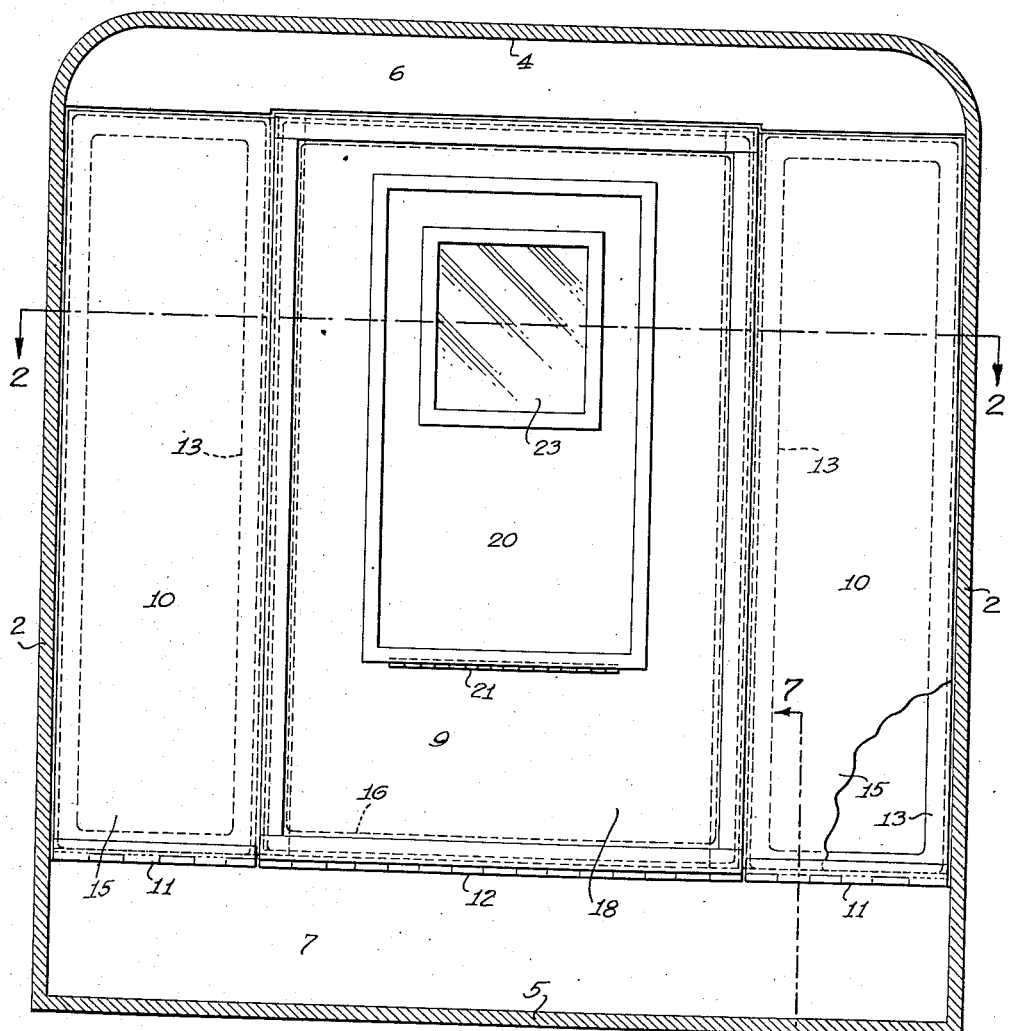
Inventor
Royale A. Wright,
By
Attorneys May 23, 1939.  R. A. WRIGHT  2,159,494
COMBINED WALL BED AND DINETTE
Filed May 24, 1937  3 Sheets—Sheet 2

Inventor
Royale A. Wright,
By
Attorneys

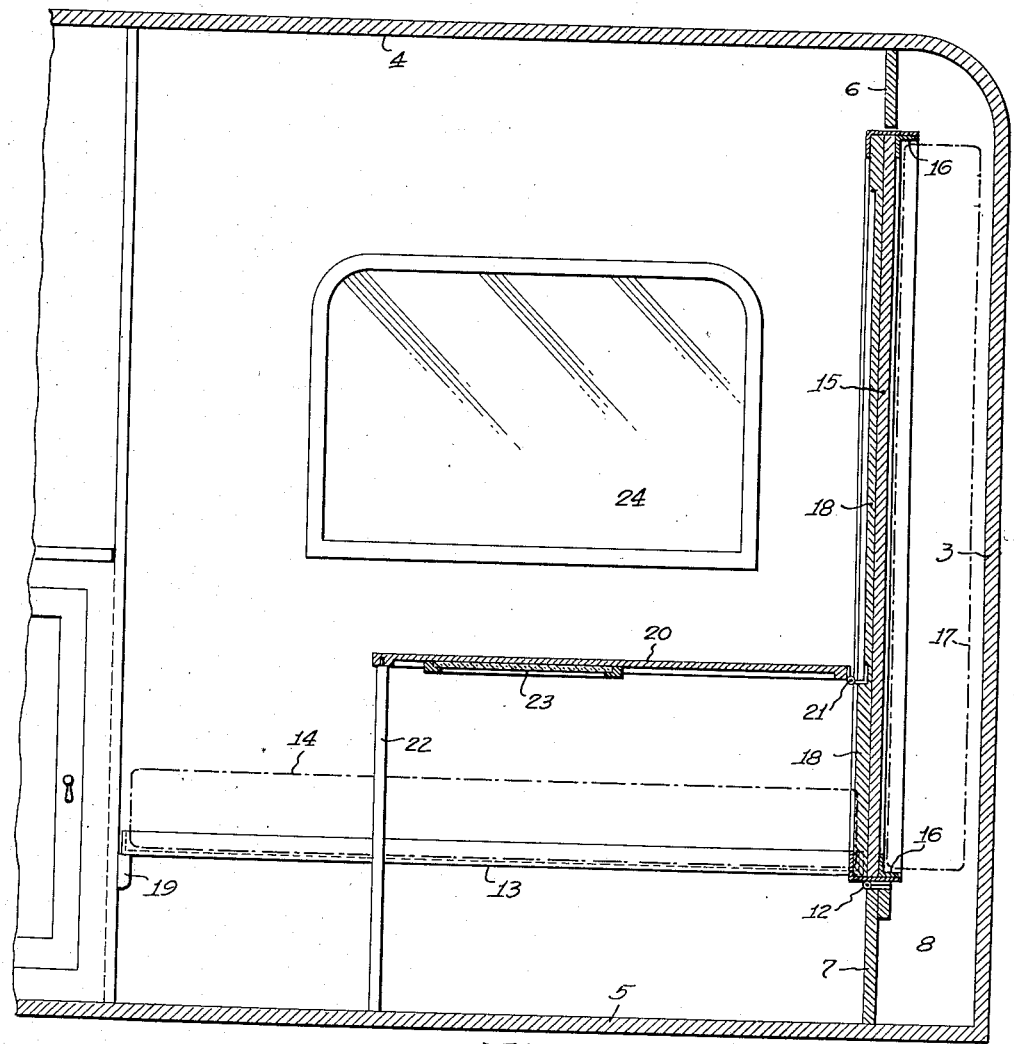
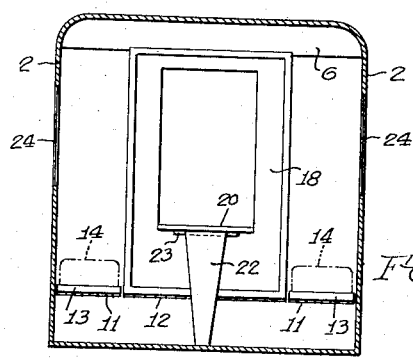
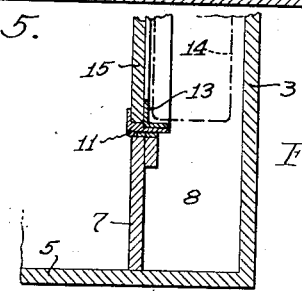

Patented May 23, 1939

2,159,494

UNITED STATES PATENT OFFICE 2,159,494

COMBINED WALL BED AND DINETTE

Royale A. Wright, Grayling, Mich.

Application May 24, 1937, Serial No. 144,419

2 Claims. (Cl. 20—1.11)

This invention relates to that class of devices known as folding or wall beds and relates more particularly to a structure which in partially unfolded position forms a dinette, providing a table and side seats.

An object of the invention is to provide a structure comprising parallel foldable sections which together when in an unfolded position form a bed and when in vertical position form a panelled wall. It is also an object to provide a structure in which the several bed sections are separately foldable and to provide the central section with a panel which is also hinged so that it may be let down to form a table, the side sections of the bed forming, when in down position, seats at opposite sides of the table.

A further object is to provide a construction which is particularly adapted for use in motor vehicle trailers and to provide certain other new and useful features in the construction, arrangement and combination of parts, all as hereinafter more fully described and shown in the accompanying drawings in which Figure 1 is a front elevation of the device in folded position and shown as applied to a trailer body;

Fig. 2 is a transverse section substantially upon the line 2—2 of Fig. 1;

Fig. 5 is a longitudinal section through the trailer body substantially the same as shown in Fig. 3 with the side sections of the bed and the table panel of the device in lowered position;

Fig. 6 is a transverse section of Fig. 5 drawn to a reduced scale, and

Fig. 7 is a sectional detail substantially upon the line 7—7 of Fig. 1.

Figure 3:
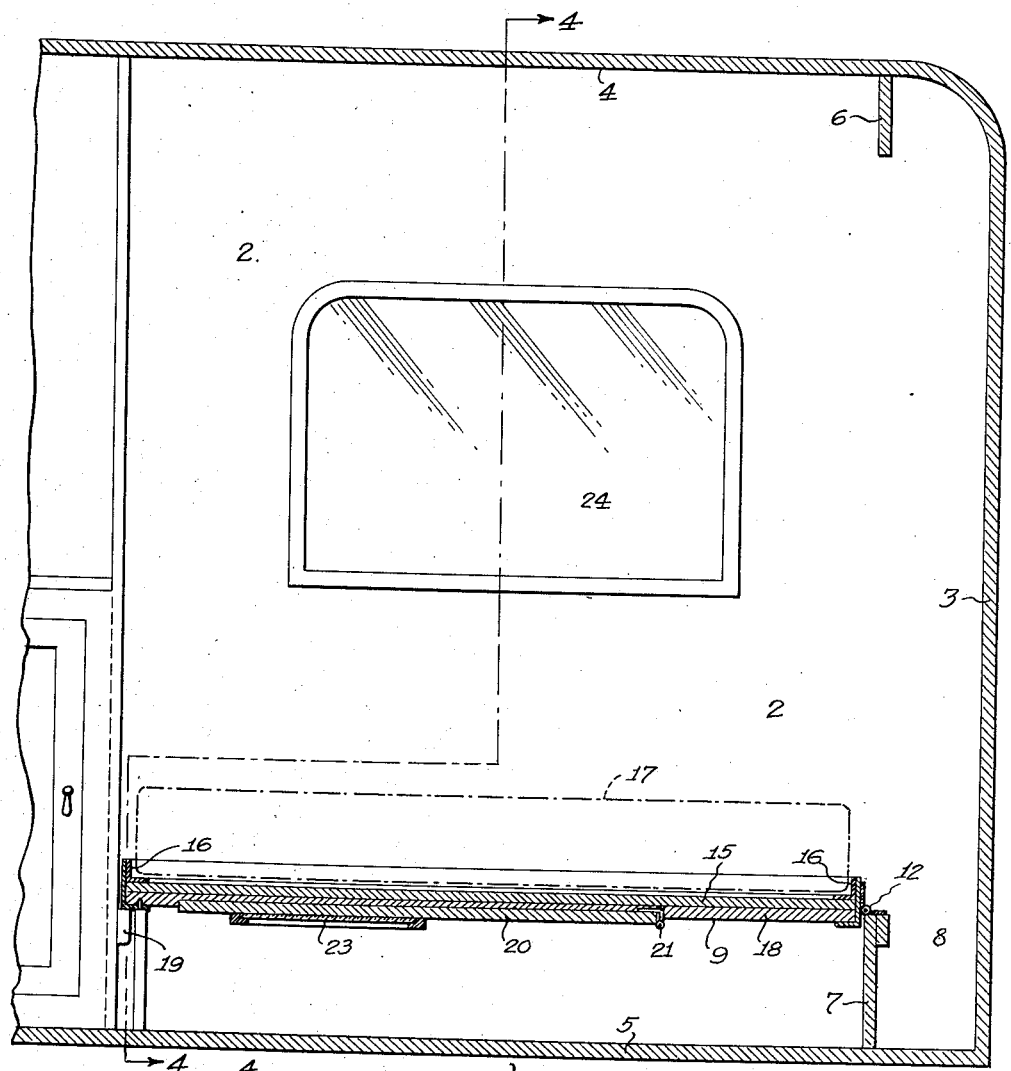
Fig. 3 is a longitudinal section of the device and of the trailer body centrally thereof and showing the sections of the folding device in unfolded position to form a bed.
Figure 4:
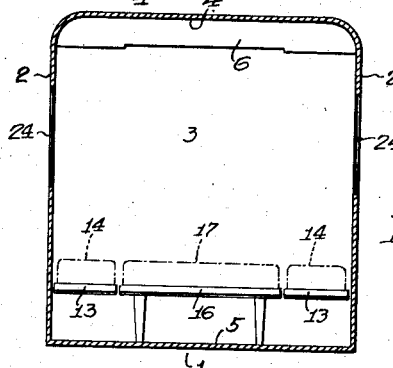
Fig. 4 is a transverse section through the body of the trailer substantially upon the line 4—4 of Fig. 3 and drawn to a reduced scale.

Wherever it is desired to conserve space, particularly within a trailer body, it is most desirable to provide a bed which may be folded to a vertical position or lowered to a horizontal position for use, and it is also desirable that this bed may be made in sections which are independently hinged for separate swinging movement so that side portions of the bed may be swung to a horizontal position and serve as seats, the central portion of the bed being arranged to remain in a vertical position and to form a support and housing for the table which may be let down between the side seats, the whole arrangement providing a dinette.

As shown in the accompanying drawings 1 indicates as a whole a trailer body having side walls 2, a rear end wall 3, a roof 4 and a floor 5. At a short distance forwardly from the rear wall 3, a transverse wall 6 extends across the body adjacent the roof 4 and projects downwardly for a distance substantially equal to the curved upper end portions of the side walls 2 which meet the roof 4. Extending across the body and resting upon the floor 5 is a second wall 7, both walls 6 and 7 being spaced from the end wall 3 of the body to form an end chamber 8, the wall 7 forming a support for the bed structure which is hingedly connected to this wall and is adapted to fold upwardly into a vertical position with the chamber 8 forming a recess to receive the springs and mattress of the bed.

The bed comprises three sections, a central section indicated as a whole by the numeral 9, and two side sections each indicated as a whole by the numeral 10. The side sections are hingedly connected as at 11 at their lower ends to the upper edge of the transverse wall 7, and in a like manner the central section 9 is hinged as at 12 to the upper edge of this transverse wall, the hinges of all three sections being in horizontal alignment. Each side section 10 comprises a supporting frame 13 preferably formed of angle iron and of rectangular form into which is adapted to be set a spring mattress section indicated in dotted lines 14, this frame serving to firmly hold the spring mattress section 14 in position thereon when the section is swung upwardly to the vertical position and also when lowered to a horizontal position by turning upon its hinge connection 11 with the transverse wall 7.

To form a finish or panel to cover the exposed side of the frame 13 when the section is in vertical position, a sliding panel 15 is provided for each section so that these panels may be slid laterally from across the forward side of the frames 13 and then these frames may be turned downwardly to a horizontal position upon their hinges.

The central section 9 comprises a rectangular frame 16 also preferably formed of angle iron and of rectangular form, the lower end of this frame being pivotally attached to the upper edge of the wall 7 by means of its hinge 12. To conceal the frame 16 which forms a rigid support for the spring mattress indicated in dotted lines 17 forming the central portion of the bed, a panel 18 is secured in any suitable manner to the frame 16 in spaced relation thereto so that, when the section 9 is in folded or vertical position, the exposed side of the section will be covered, and, when the section is in unfolded or horizontal position, this panel 18 will be at the lower side of the bed. The space between the panel 18 and the adjacent side of the frame 16 forms a way for the sliding panels 15 of the side sections 10 and therefore, when all of the sections are in vertical position, these sliding panels 15 may be slid laterally within the way and housed within the central section 9 upon the front panel 18 of that section where they will be enclosed from view, and then the side sections 10 may be swung downwardly to a horizontal position with their free ends resting upon a ledge 19 or other support, as when the present device is installed within an automobile trailer as shown.

In the front or exposed side of the panel 18, when the central section 9 is in vertical position, is a central panel 20 within a shallow recess in the front side of the panel 18, this panel 20 being hinged as at 21 for downward swinging movement to a horizontal position where it will be supported at its free end by any suitable support, such as a leg 22. This panel 20 when in horizontal position forms a table between the side sections 10 when said table and side sections are lowered to a horizontal position, the table and side sections thus forming a dinette with the side sections providing seats at opposite sides of the table, the spring mattress 14 upon each side section being lowered with the section and forming a cushion for the seat.

Rigidly secured to the panel 20, a mirror 23 may be provided, and in the side walls 2 of the trailer body windows 24 may be provided to give cross ventilation.

When the three bed sections 9 and 10 are all swung to a horizontal position, the spring mattress carried thereby forms a complete bed extending from side wall to side wall of the trailer and, when these sections are all raised to a vertical position, the mattress sections are housed within the chamber 8 and are completely concealed from view by the front panel 18 of the central section and the sliding panels 15 of the side sections, thus presenting a very neat appearance and a compact arrangement in which the full width of the trailer body is utilized.

Obviously the present combined folding bed and dinette may be installed within small apartments where conservation of space is highly desirable, and it is also obvious that the particular construction and arrangement of sections may be modified without departing from the spirit of the invention and I do not therefore limit myself to the particular construction shown.

Having thus fully described my invention what I claim is:

1. A wall structure for a room comprising, a series of panels, lying in substantially the same vertical plane, some of said panels being supported for movement toward each other in the same plane and to be concealed thereafter behind another of said panels for movement together about a horizontal axis.

2. A wall structure for a room comprising, a series of panels, said panels defining a vertical plane, two of said panels being spaced by a third panel and adapted for movement toward each other and for total confinement behind said third panel for subsequent unitary movement about a horizontal axis with said latter panel.

ROYALE A. WRIGHT.